(12) United States Patent
Webster et al.

(10) Patent No.: US 7,866,344 B2
(45) Date of Patent: Jan. 11, 2011

(54) ROTARY VALVE

(75) Inventors: Nathan Webster, Cardiff (GB); David Mark Hampson, South Glamorgan (GB)

(73) Assignee: Huntleigh Technology Limited (GB)

( * ) Notice: Subject to any disclaimer, the term of this patent is extended or adjusted under 35 U.S.C. 154(b) by 778 days.

(21) Appl. No.: 11/718,925

(22) PCT Filed: Nov. 8, 2005

(86) PCT No.: PCT/GB2005/004305

§ 371 (c)(1),
(2), (4) Date: Sep. 24, 2007

(87) PCT Pub. No.: WO2006/051280

PCT Pub. Date: May 18, 2006

(65) Prior Publication Data

US 2008/0105842 A1     May 8, 2008

(30) Foreign Application Priority Data

Nov. 10, 2004    (GB) .................................. 0424870.4

(51) Int. Cl.
*F15B 13/044* (2006.01)
(52) U.S. Cl. .............................. 137/625.21; 137/596.17; 137/596.2
(58) Field of Classification Search ............ 137/625.15, 137/625.21, 625.23, 596, 596.17, 596.2
See application file for complete search history.

(56) References Cited

U.S. PATENT DOCUMENTS

| 3,116,757 | A | 1/1964 | Donguy et al. |
| 5,152,319 | A | 10/1992 | Hannagan et al. |
| 6,257,279 | B1 | 7/2001 | Peltz |
| 2002/0121307 | A1 | 9/2002 | Stacy |
| 2002/0124895 | A1* | 9/2002 | Thiele et al. ........... 137/625.46 |
| 2004/0129911 | A1 | 7/2004 | Promper et al. |

FOREIGN PATENT DOCUMENTS

EP    0089937 A1 *   9/1983

* cited by examiner

*Primary Examiner*—John Rivell
(74) *Attorney, Agent, or Firm*—Craig A. Fieschko, Esq.; DeWitt Ross & Stevens S.C.

(57) ABSTRACT

A rotary valve for controlling air supply in an inflatable device comprises a first rotor (11) and the second rotor (12) driven by motor (13) with a drive pulley (14) fixed directly onto its drive spindle (15). A toothed belt (16) driven by the drive pulley (14) engages with the toothed perimeter profile of the first rotor (11), to rotate rotors (11) and (12) relative to a stator (10). As the first and/or second rotor(s) are rotated, channels and ports on the airtight interfaces between the rotors (11, 12) and the stator (10) are connected and disconnected as required by the desired inflation sequence, including all the ports sealed in one position or all the ports exhausting to atmosphere in another position. The valve can be used in conjunction with any type of inflating device, where complex porting or air routing is required, the valve achieving this in a simpler manner.

20 Claims, 3 Drawing Sheets

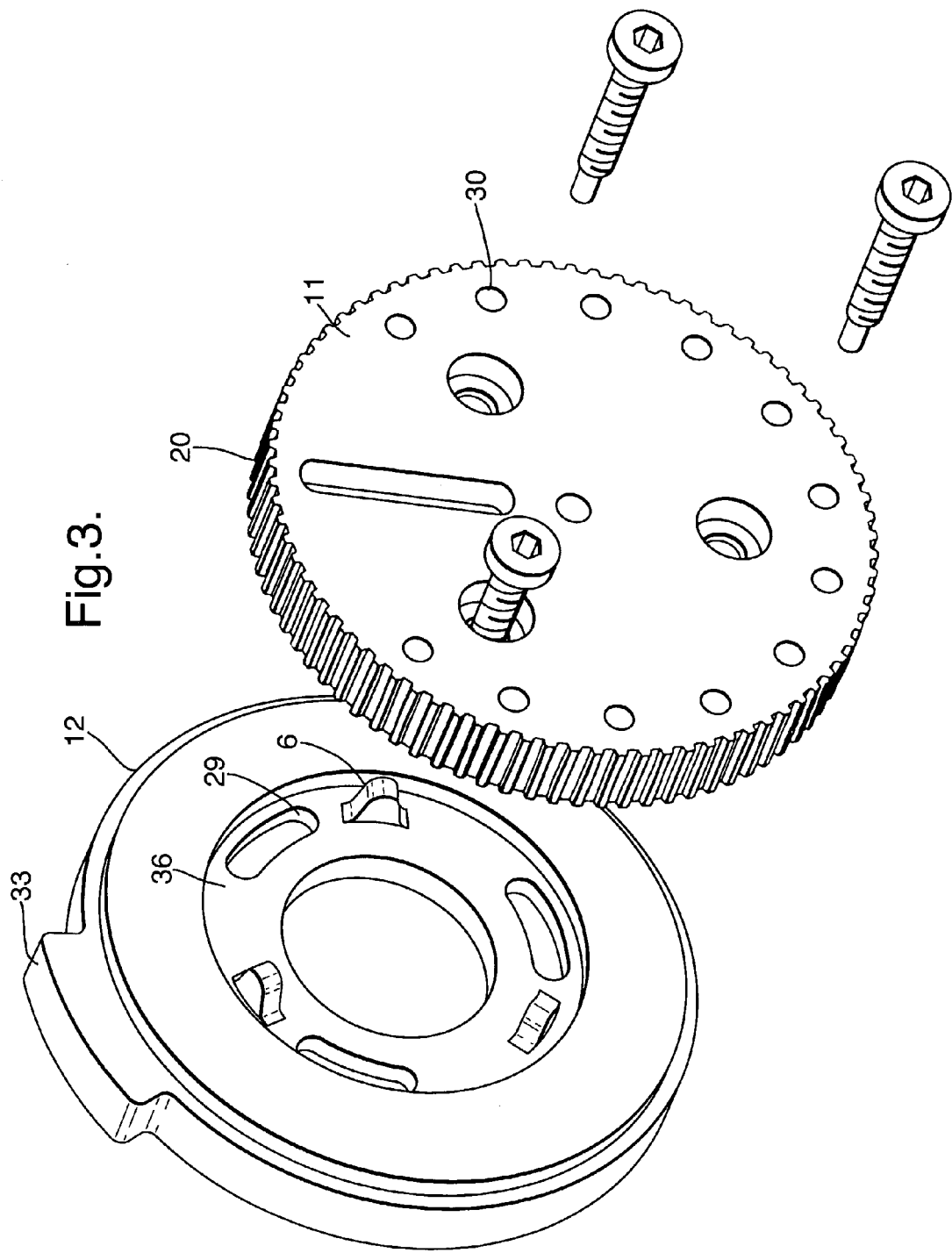

ance of
ROTARY VALVE

FIELD OF THE INVENTION

The present invention relates to rotary valves and in particular, to rotary valves controlling the air supply in an inflatable device.

BACKGROUND OF THE INVENTION

It is known to use rotary valves to control the air supply from medical air pumps to provide compressed air in a specific sequence, to an inflatable device, for example an air mattress or a compression garment.

In most rotary valves, the provision of compressed air in a specific sequence is determined by ports and channels built into two parts, the rotor and the stator, that rotate relative to each other. The rotor and stator are discs of suitable solid material that are held together by spring force with flat mating faces forming an airtight seal.

As the rotor rotates relative to the fixed stator, different ports in the mating faces of the two parts are connected together and so vary the routing of compressed air through the valve. The porting is designed and made to follow the desired sequence of inflation for the inflatable device.

The sequence of port connections can be quite ingenious, but as the required sequence becomes more complex a large diameter valve is required which is costly and difficult to manufacture requiring a high torque motor to drive it. Furthermore, a design with more complex porting results in limited separation between the ports leading to inaccuracies and air leaks.

SUMMARY OF THE INVENTION

This invention seeks to make improvements.

Accordingly, the invention provides a rotary valve for controlling air supply to an inflatable device comprising a stator member having a planar surface and a number of ports for communication with the inflatable device, and a further port for connection to an air source, a first rotor member having a planar surface and rotatable in face to face contact with the stator planar surface, the first rotor member having ports and channels and when in contact with the stator being supplied with air from the further port, a second rotor member having a planar surface and rotatable in face to face contact with the first rotor member, the second rotor member having channels and ports, at least one drive means for rotating the first and second rotors, and control means for driving and controlling the duration of air supply to the device.

Preferably, a single drive means rotates the two rotor members with respect to each other and the stator member. In a preferred embodiment, the drive means moving the first rotor member relative to the stator member also drives the second rotor member by means of an arm on one of the rotor members abutting a fixed detent on the valve body, the abutment retaining that rotor member with the arm while the other rotor member continues to rotate.

In another preferred embodiment, the rotor members are driven by drive means wherein the seal between the first and second rotors is allowed to be opened at a certain location during the relative movement of the rotor members to enable the exhaust of air to atmosphere.

In a further preferred embodiment, relative movement of the rotor members results in all the ports being sealed in one position of the valve members and vented to atmosphere in a second position.

In another aspect of the invention, the invention provides a rotary valve for controlling air supply to an inflatable device comprising a stator member and a rotor member rotatable in face to face contact with the stator, the rotor member perimeter surface provided with a toothed profile, drive means to drive the rotor member wherein the drive means cooperates with the rotor member toothed profile to drive the rotor member. Preferably, the drive means includes a belt cooperating with the rotor member toothed profile to drive the motor.

The invention has the advantage that whilst existing rotary valves consisting of a stator and a rotor have the rotor driven by means of an electric motor gearbox and coupling device connecting the gearbox output shaft to the rotor, the invention replaces the gearbox and coupling device with a gear or belt driven system. The overall system is simpler with a reduced number of parts.

Preferably, the rotor member gear tooth profiles are an integral part of the rotor body. Preferably, gear reduction is provided by a small gear or pinion on the driving motor shaft and a large gear profile around the circumference of the rotor, thereby achieving a step down gear and increase in effective torque without having a separate gearbox. Also, an additional coupling device to connect the motor to the rotor as with prior art systems is not required.

BRIEF DESCRIPTION OF THE DRAWINGS

The invention will now be described in detail, by way of example, with reference to the accompanying drawings, in which:—

FIG. 3 is an exploded view of the first and second rotors according to a preferred embodiment of the invention.

DETAILED DESCRIPTION OF PREFERRED VERSIONS OF THE INVENTION

Figure 1:
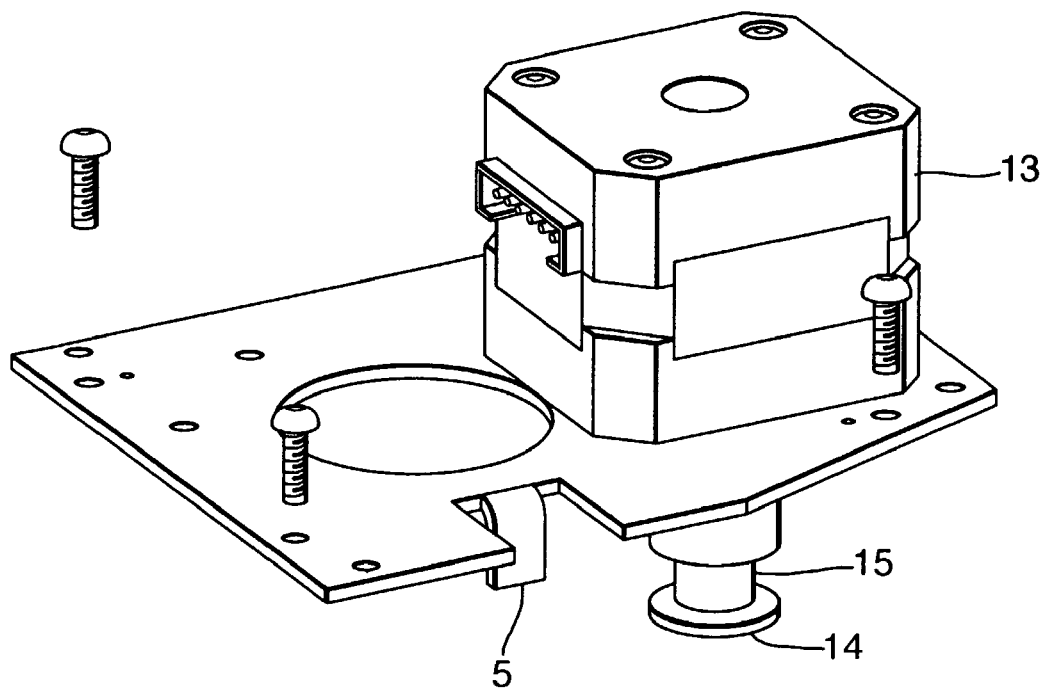
FIG. 1 is a schematic view of a rotary valve according to the invention.
Figure 1:
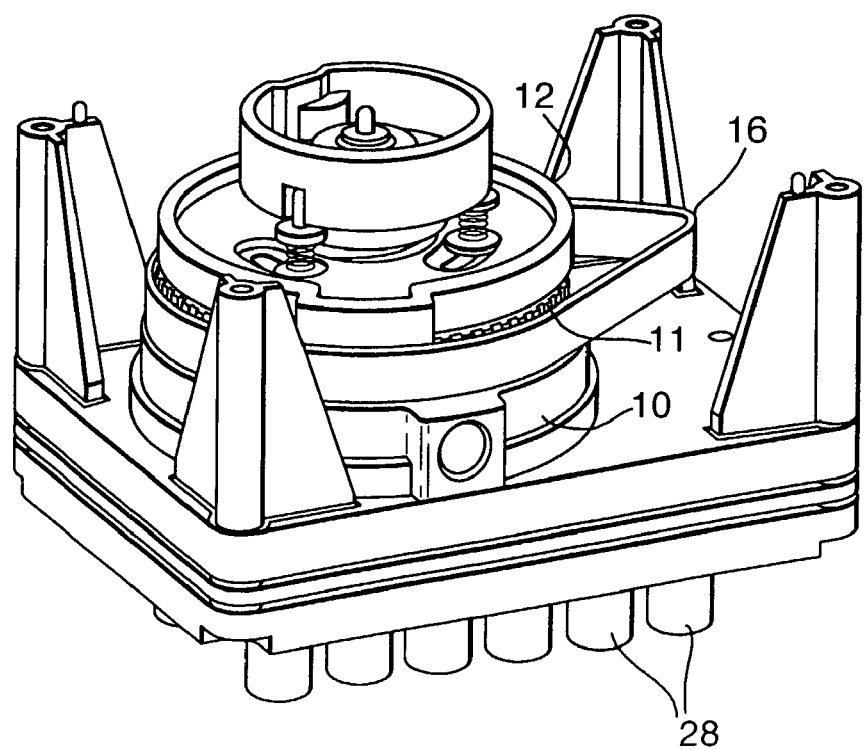

Referring to the Figures, the rotary valve is mounted as shown in FIG. 1 on a plate above which is located a motor 13 with a drive pulley 14 fixed directly onto its drive spindle 15. A toothed belt 16 is driven by the drive pulley 14 and engages with the toothed profile of the perimeter 20 of the first rotor 11, to rotate the rotors 11 and 12 relative to the stator 10. The rotors 11, 12 can be driven in any direction by the motor. Preferably, the rotor 11 tooth profile around the perimeter is an integral part of the rotor 11. A suitably tensioned belt drive 16 connects the two pulley profiles and gear reduction is achieved by the relative number of teeth on each pulley profile.

Instead of the belt drive 16, the rotor 11 can be provided with a spur gear profile on its perimeter to mesh with a matching drive pinion gear fitted to the drive spindle of the motor 13.

Figure 2:
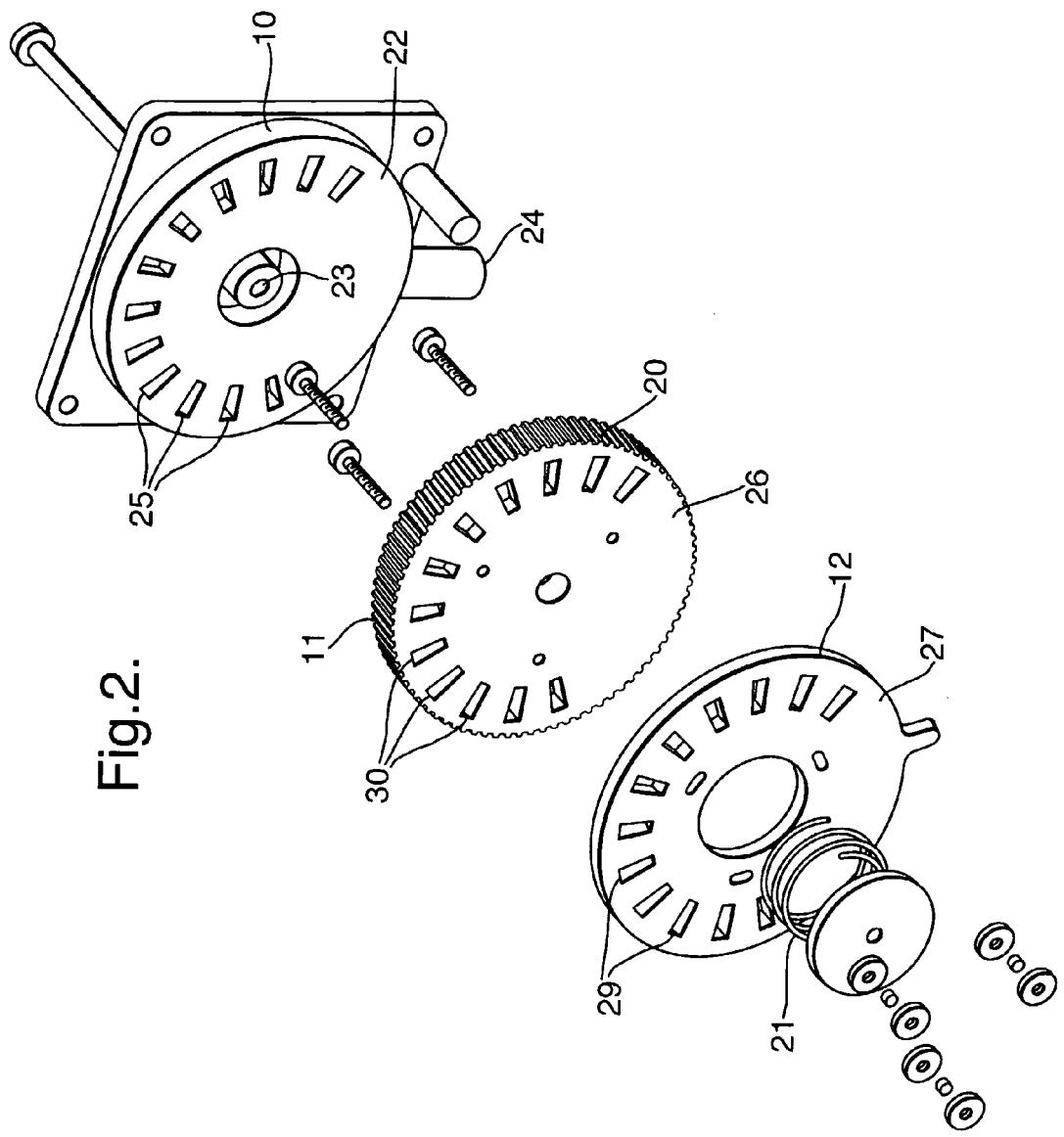
FIG. 2 is an exploded view of the valve in FIG. 1.

FIG. 2 shows the stator 10, the rotors 11, 12 planar surfaces in face to face contact in the exploded view. Springs 21 are provided to press these valve parts together.

The stator surface 22, has a central opening 23 for admission of pressurized air from a pump (not shown). The pump is connected to an air inlet 24 on one side of the stator surface 22. The stator surface 22 also incorporates a plurality of ports 25 connected to outlet ports 28 for connection to an inflatable device.

The first rotor surface 26 incorporates ports 30 to cooperate with ports 25, 28 within the stator 11 and the ports 29 of the second rotor 12. The second rotor surface 27 includes ports 29 for routing air in combination with the first rotor ports 30 and the stator ports 25, 28.

In operation, as the first and/or second rotor(s) are rotated the channels and ports on the airtight interfaces between the rotors 11, 12 and the stator 10 are connected and disconnected as required by the desired inflation sequence.

The first rotor 11 and the second rotor 12 are driven by motor 13. Any suitable motor or motors can be used to drive the rotors 11, 12. In a preferred embodiment as shown in FIG. 3, the second rotor 12 includes an arm 33 on its perimeter which during the rotation of the second rotor 12 comes into contact with an abutment 5 on the valve body, resulting in the movement of the second rotor being arrested whilst the first rotor continues to rotate.

The first and second rotors 11 and 12 have a lifting cam profile 6 in between which during this relative rotation causes the second rotor 12 to lift away from the first rotor face breaking the airtight seal and allowing compressed air to exhaust to atmosphere. Reverse rotation of the two rotors 11, 12 by the motor 13 results in the arm 33 moving away from the abutment 5 and the second rotor 12 surface moving down the cam profile 6 to once again be in airtight sealing engagement.

Alternatively, the two rotors 11, 12 do not have the cam arrangement and the two rotors 11, 12 rotate and slide relative to each other providing different port combinations, so that in one configuration all the ports are sealed and in another configuration all the ports exhaust to atmosphere. Additionally, the second rotor 12 can also have interconnecting ports that change as the two rotors are moved relative to each other providing further permutations of port connections to the valve.

The valve can be used in conjunction with any type of inflating device, where complex porting or air routing is required, the valve achieving this in a simpler manner.

The invention claimed is:

1. A rotary valve for controlling air supply to an inflatable device comprising:
   a. a stator member having a planar surface and a number of outlet ports for communication with the inflatable device, and an inlet port for connection to an air source,
   b. a first rotor member having a planar surface and rotatable in face to face contact with the stator planar surface, the first rotor member having ports and channels and when in contact with the stator being supplied with air from the inlet port,
   c. a second rotor member having a planar surface and rotatable in face to face contact with the first rotor member, the second rotor member having ports,
   d. at least one drive means for rotating the first and second rotors, and
   e. control means for driving and controlling the duration of air supply to the device.

2. A rotary valve as claimed in claim 1 wherein a single drive means rotates the two rotor members with respect to each other and the stator member.

3. A rotary valve as claimed in claim 2 wherein the drive means moving the first rotor member relative to the stator member also drives the second rotor member by means of an arm on one of the rotor members abutting a fixed detent on the valve body, the abutment retaining that rotor member with the arm while the other rotor member continues to rotate.

4. A rotary valve as claimed in claim 1 wherein a seal between the first and second rotors is allowed to be opened at a certain location during the relative movement of the rotor members to enable the exhaust of air to atmosphere.

5. A rotary valve as claimed in claim 1 wherein relative movement of the rotor members results in all the ports being sealed in one position of the valve members and all the ports vented to atmosphere in a second position.

6. A rotary valve as claimed in claim 1 wherein the first rotor has a toothed profile.

7. A rotary valve as claimed in claim 6, further including a belt fit about the toothed profile.

8. A rotary valve as claimed in claim 7 wherein the belt engages the drive means, whereby actuation of the drive means drives the belt to rotate the first rotor.

9. A rotary valve for controlling air supply to an inflatable device, the rotary valve including:
   a. a stator having:
      (1) a stator opening for communication with an air source,
      (2) a stator surface having a number of stator ports defined therein for communication with the inflatable device,
   b. a first rotor rotatable about a first rotor axis with respect to the stator, the first rotor having a first rotor inner surface and an opposing first rotor outer surface wherein:
      (1) the first rotor inner surface is rotatable in face-to-face contact with the stator surface,
      (2) the first rotor inner surface has an elongated first rotor channel defined therein, wherein the first rotor channel is:
         (a) open with respect to the stator opening as the first rotor rotates with respect to the stator, whereby the first rotor channel receives air from the stator opening;
         (b) also open with respect to one of the stator ports when the first rotor and the stator are at one or more selected rotational orientations with respect to each other;
      (3) several first rotor outlet ports extend between the first rotor inner surface and the first rotor outlet surface, the first rotor outlet ports being rotatable into alignment with the stator ports to communicate air therebetween;
   c. a second rotor situated adjacent the first rotor outlet surface, the second rotor having a second rotor inner surface and an opposing second rotor outer surface, wherein the second rotor inner surface:
      (1) is rotatable with respect to the first rotor outer surface,
      (2) is biased into face to face contact with the first rotor outer surface,
      (3) bears a cam profile thereon, wherein the cam profile lifts the second rotor inner surface from the first rotor outer surface when the first and second rotors are at one or more selected rotational orientations with respect to each other,
   whereby:
   A. the stator and first rotor may be rotationally oriented with respect to each other to pass air from the stator opening to the first rotor channel, and in turn to the stator ports, whereby any inflatable device in communication with the stator ports receives the air; and
   B. the stator, first rotor and second rotor may be rotationally oriented with respect to each other to:
      i. have the cam profile lift the second rotor inner surface from the first rotor outer surface, and
      ii. align the stator ports with the first rotor outlet ports, whereby any inflatable device in communication with the stator ports may vent air to the stator ports, and in turn to the first rotor outlet ports.

10. The rotary valve of claim 9 wherein the first rotor has a toothed outer profile between the first rotor inner surface and first rotor outer surface.

11. The rotary valve of claim 9 wherein the second rotor has:
  a. a second rotor perimeter extending between the second rotor inner surface and second rotor outer surface, and
  b. an arm extending outwardly from the second rotor perimeter.

12. The rotary valve of claim 9:
  a. further comprising an abutment fixed against motion with respect to the stator;
  b. wherein the second rotor has an arm extending therefrom, the arm interfering with the abutment when the stator and the second rotor are at one or more selected rotational orientations with respect to each other.

13. The rotary valve of claim 9 wherein the second rotor includes one or more second rotor outlet ports extending between the second rotor inner surface and the second rotor outlet surface, the second rotor outlet ports being rotatable into alignment with one or more of the first rotor outlet ports to communicate air therebetween.

14. The rotary valve of claim 9:
  a. wherein the second rotor includes curved slots defined therein, and
  b. further comprising fasteners extending from the first rotor into the curved slots.

15. The rotary valve of claim 9 wherein the first rotor channel and first rotor outlet ports are spaced about a clockwise/counterclockwise direction along the first rotor.

16. The rotary valve of claim 9 wherein:
  a. the second rotor includes one or more second rotor outlet ports extending between the second rotor inner surface and the second rotor outlet surface,
  b. the cam profile and the second rotor outlet ports are spaced about a clockwise/counterclockwise direction along the second rotor.

17. A rotary valve for controlling air supply to an inflatable device, the rotary valve including:
  a. a stator having:
    (1) a stator opening for communication with an air source,
    (2) a stator surface having a number of stator ports defined therein for communication with the inflatable device,
  b. a first rotor rotatable about a first rotor axis with respect to the stator, the first rotor having a first rotor inner surface and an opposing first rotor outer surface wherein:
    (1) the first rotor inner surface is rotatable in face-to-face contact with the stator surface,
    (2) the first rotor inner surface has an elongated first rotor channel defined therein, wherein the first rotor channel is:
      (a) open with respect to the stator opening as the first rotor rotates with respect to the stator, whereby the first rotor channel receives air from the stator opening;
      (b) also open with respect to one of the stator ports when the first rotor and the stator are at one or more selected rotational orientations with respect to each other;
    (3) several first rotor outlet ports extend between the first rotor inner surface and the first rotor outlet surface, the first rotor outlet ports being rotatable into alignment with the stator ports to communicate air therebetween;
  c. a second rotor situated adjacent the first rotor outlet surface, the second rotor having a second rotor inner surface and an opposing second rotor outer surface, wherein:
    (1) the second rotor inner surface is rotatable in face-to-face contact with the stator surface,
    (2) several second rotor outlet ports extend between the second rotor inner surface and the second rotor outlet surface;
  whereby:
  A. the stator and first rotor may be rotationally oriented with respect to each other to pass air from the stator opening to the first rotor channel, and in turn to the stator ports, whereby any inflatable device in communication with the stator ports receives the air; and
  B. the stator, first rotor and second rotor may be rotationally oriented with respect to each other to pass air from any inflatable device in communication with the stator ports to the first rotor outlet ports, and subsequently to the second rotor outlet ports.

18. The rotary valve of claim 17 wherein the second rotor inner surface bears a cam profile thereon, wherein the cam profile urges the second rotor inner surface from the first rotor outer surface when the first and second rotors are at one or more selected rotational orientations with respect to each other.

19. The rotary valve of claim 17 wherein the second rotor outlet ports are rotatable into alignment with the first rotor outlet ports to communicate air therebetween.

20. The rotary valve of claim 17 wherein the first rotor has a toothed outer profile between the first rotor inner surface and first rotor outer surface.

* * * * *